(12) United States Patent
Nishiyabu et al.

(10) Patent No.: US 11,761,368 B2
(45) Date of Patent: Sep. 19, 2023

(54) ENGINE UNIT

(71) Applicant: KAWASAKI MOTORS, LTD., Akashi (JP)

(72) Inventors: Masaki Nishiyabu, Akashi (JP); Yuji Hida, Akashi (JP); Tetsuji Yamamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/901,333

(22) Filed: Sep. 1, 2022

(65) Prior Publication Data

US 2023/0072896 A1    Mar. 9, 2023

(30) Foreign Application Priority Data

Sep. 2, 2021   (JP) ................................. 2021-142941

(51) Int. Cl.
| | |
|---|---|
| *F01P 3/20* | (2006.01) |
| *F01P 3/08* | (2006.01) |
| *F02N 11/08* | (2006.01) |
| *F01P 11/14* | (2006.01) |

(52) U.S. Cl.
CPC ................... *F01P 3/20* (2013.01); *F01P 3/08* (2013.01); *F02N 11/08* (2013.01); *F01P 11/14* (2013.01)

(58) Field of Classification Search
CPC ...... F01P 3/20; F01P 3/08; F01P 11/14; F02D 37/02; F02N 11/08; H02P 6/08; H02P 6/16
See application file for complete search history.

(56) References Cited

U.S. PATENT DOCUMENTS

2009/0020092 A1 *  1/2009  Kishibata .............. F02N 11/101
                                                       123/179.5
2019/0323469 A1 * 10/2019  Hao ......................... H02P 6/08

FOREIGN PATENT DOCUMENTS

| CN | 105191081 | * | 11/2017 |
|---|---|---|---|
| EP | 2963784 A1 | | 1/2016 |
| JP | 2007218703 | * | 8/2007 |
| JP | 2015194127 | * | 11/2015 |
| WO | 2014-132719 A1 | | 9/2014 |

* cited by examiner

*Primary Examiner* — Syed O Hasan
(74) *Attorney, Agent, or Firm* — Procopio, Cory, Hargreaves & Savitch LLP

(57) ABSTRACT

An engine unit includes a cylinder, a crankshaft, a crankcase, a generator, a sensor, and a coolant passage. The crankshaft is connected to a piston in the cylinder. The crankcase accommodates the crankshaft therein. The generator includes a rotor that rotates together with the crankshaft and a stator facing the rotor. The generator generates electric power by rotation of the rotor. The sensor detects a rotation position of the rotor. The coolant passage includes an ejection port, guides a coolant to the ejection port, and ejects the coolant from the ejection port toward the sensor.

11 Claims, 10 Drawing Sheets

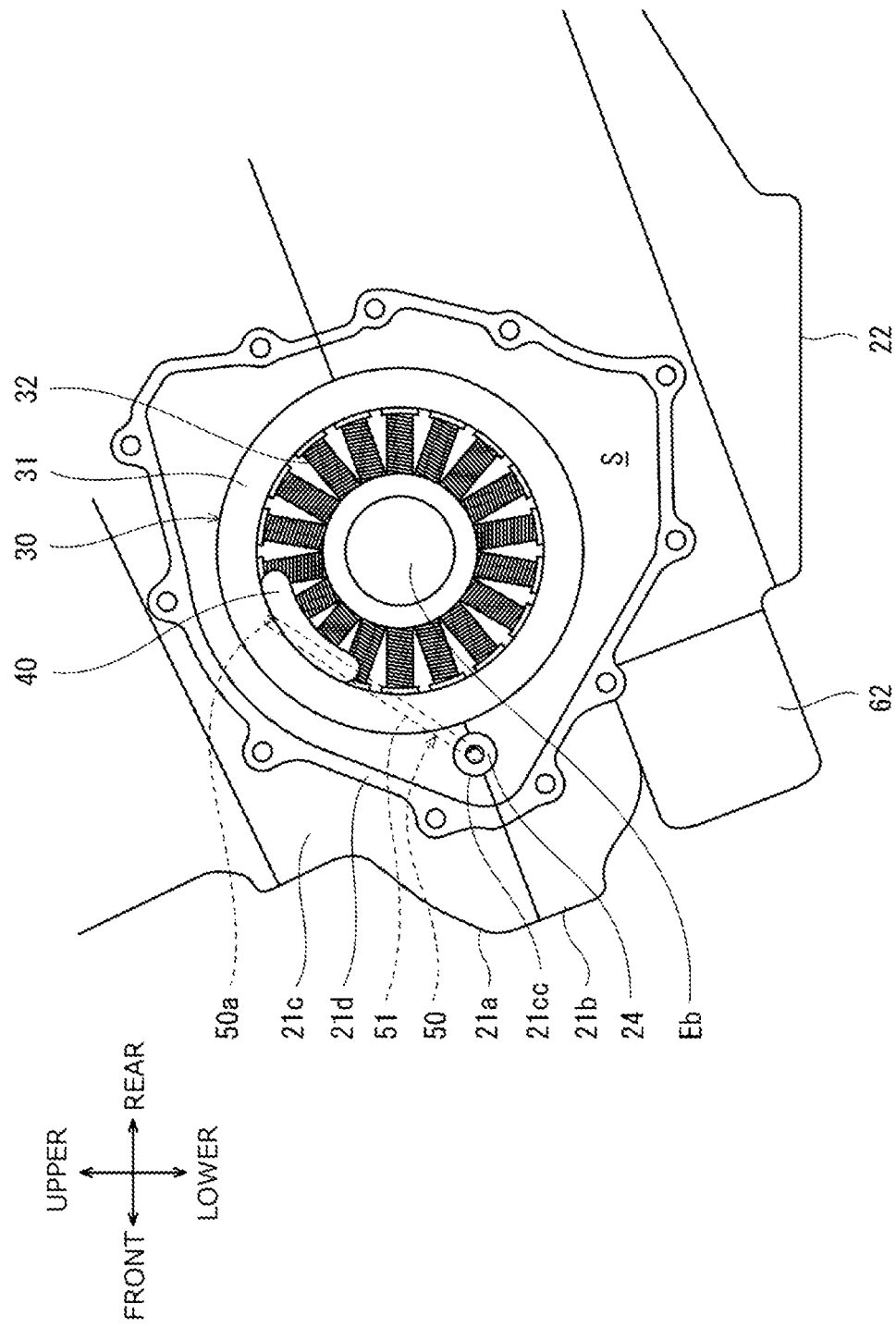

ENGINE UNIT

CROSS-REFERENCE TO RELATED APPLICATIONS

This application is based on and claims priority under 35 USC 119 from Japanese Patent Application No. 2021-142941 filed on Sep. 2, 2021, the contents of which are incorporated herein by reference.

TECHNICAL FIELD

The present disclosure relates to an engine unit.

BACKGROUND ART

WO2014/132719 discloses an engine unit of a motorcycle or the like, in which the engine unit is equipped with an AC generator, for example, an integrated starter generator (ISG). The engine unit includes a sensor that detects a rotation position of a rotor of the generator.

Depending on an operating state of the engine, a temperature of the generator may be high, and it is required to effectively cool the sensor.

SUMMARY

The present disclosure relates to an engine unit capable of effectively cooling a sensor that detects a rotation position of a rotor of a generator.

In accordance with an aspect, an engine unit includes a cylinder, a crankshaft connected to a piston in the cylinder, a crankcase that accommodates the crankshaft, a generator that includes a rotor that rotates together with the crankshaft and a stator facing the rotor and generates electric power by rotation of the rotor, a sensor configured to detect a rotation position of the rotor, and a coolant passage that includes an ejection port, guides a coolant to the ejection port, and ejects the coolant from the ejection port toward the sensor.

BRIEF DESCRIPTION OF DRAWINGS

FIG. 4 is a partially enlarged left side view of the engine unit in FIG. 1 with a cover removed;

DESCRIPTION OF EMBODIMENTS

Exemplary embodiments will be described with reference to drawings.

Figure 1:
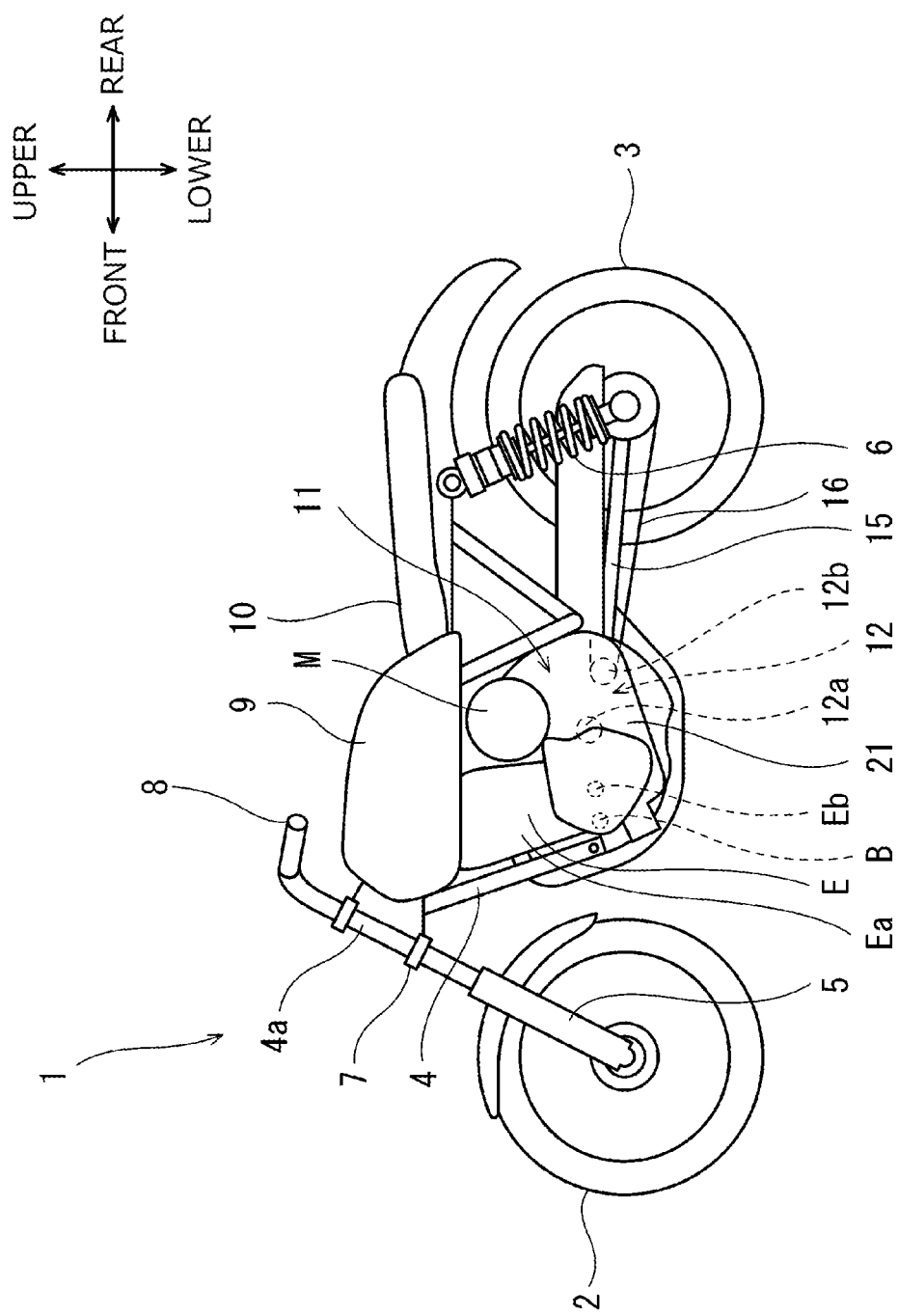
FIG. 1 is a left side view of a motorcycle including an engine unit according to one embodiment of the present invention.

FIG. 1 is a left side view of a motorcycle 1 including an engine unit 11 according to one embodiment. The motorcycle 1 is an example of a saddle riding vehicle on which a rider straddles, and is a hybrid vehicle. Directions in the following description are based on a direction viewed by a rider of the motorcycle 1, a front-rear direction corresponds to a vehicle length direction, and a left-right direction corresponds to a vehicle width direction.

The motorcycle 1 includes a front wheel 2, a rear wheel 3, a vehicle body frame 4, a front suspension 5 that connects the front wheel 2 to a front portion of the vehicle body frame 4, and a rear suspension 6 that connects the rear wheel 3 to a rear portion of the vehicle body frame 4. The front suspension 5 is connected to brackets 7 disposed at an interval in an upper-lower direction. A steering shaft connected to the bracket 7 is supported by a head pipe 4a so as to be angularly displaceable, the head pipe 4a being a part of the vehicle body frame 4. A handle 8 to be gripped by hands of the rider is provided on the steering shaft. A fuel tank 9 is provided on a rear side of the handle 8, and a seat 10 on which the rider sits is provided on a rear side of the fuel tank 9.

A swing arm 15 that supports the rear wheel 3 and extends in the front-rear direction is supported on the vehicle body frame 4 so as to be angularly displaceable. The engine unit 11 serving as a drive source is mounted on the vehicle body frame 4 between the front wheel 2 and the rear wheel 3.

The engine unit 11 includes an engine E and a drive motor M. The engine E is an internal combustion engine as a power source. The drive motor M is an electric motor as a power source. The engine E includes a cylinder Ea and a crankshaft Eb connected to a piston in the cylinder Ea. A balancer shaft B having a balancer weight is disposed on a front side of the crankshaft Eb. The balancer shaft B inhibits primary couple vibration of the crankshaft Eb. A gear that rotates together with the crankshaft Eb and a gear that rotates together with the balancer shaft B mesh with each other, and the balancer shaft B is rotationally driven by rotation of the crankshaft Eb.

The crankshaft Eb of the engine E and the balancer shaft B are accommodated in a crankcase 21. An oil pan 22 is provided in a lower portion of the crankcase 21. The oil pan 22 stores oil that falls downward from a crank chamber in the crankcase 21 that accommodates the crankshaft Eb and a transmission 12. The crankshaft Eb and the balancer shaft B are parallel to each other and extend in the vehicle width direction of the motorcycle 1, that is, in the left-right direction. The transmission 12 is disposed on a rear side of the engine E. The transmission 12 is accommodated in the crankcase 21.

Figure 2:
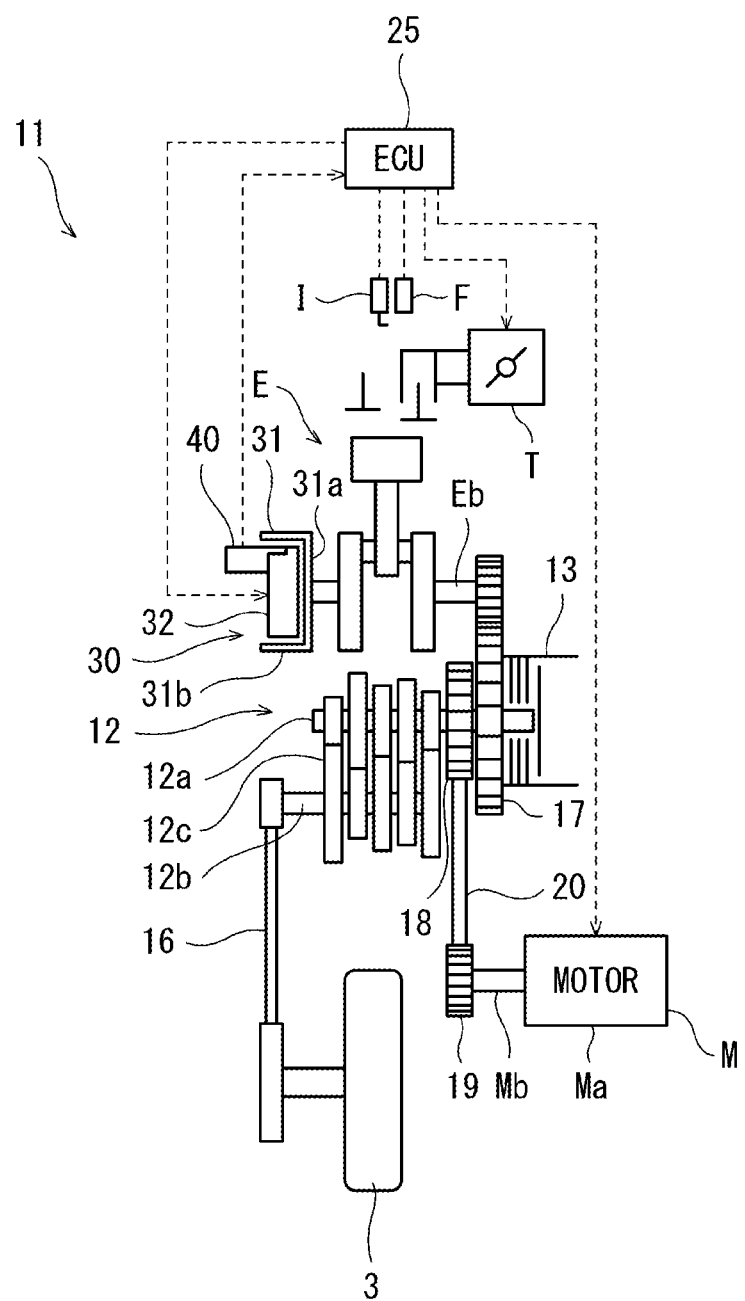
FIG. 2 is a schematic view of a power system of the motorcycle in FIG. 1.

FIG. 2 is a schematic view of a power system of the motorcycle 1 in FIG. 1. The transmission 12 includes an input shaft 12a, an output shaft 12b, and a plurality of sets of gear trains 12c having different reduction ratios. The transmission 12 is configured to be able to transmit power from the input shaft 12a to the output shaft 12b via the gear trains 12c, and selects any set of the gear trains 12c to change a speed. The input shaft 12a and the output shaft 12b are parallel to the crankshaft Eb and extend in the vehicle width direction of the motorcycle 1, that is, in the left-right direction. For example, the transmission 12 is a dog clutch type transmission. Rotation power of the output shaft 12b of the transmission 12 is transmitted to the rear wheel 3, which is a drive wheel, via an output transmission member 16. The output transmission member 16 is, for example, a chain, a belt, or the like.

A right end portion of the crankshaft Eb of the engine E is connected to a primary gear 17 in a power transmittable manner. The primary gear 17 is provided around the input shaft 12a between a main clutch 13 and the gear trains 12c in an axial direction of the input shaft 12a. The primary gear 17 is rotatable relative to the input shaft 12a. The primary gear 17 transmits rotation power from the crankshaft Eb to the main clutch 13. The primary gear 17 is connected to the input shaft 12a of the transmission 12 via the main clutch 13 in a power transmittable manner. The main clutch 13 is provided at an end portion of the input shaft 12a, and disconnects or connects a power path from the crankshaft Eb to the input shaft 12a. The main clutch 13 is of a hydraulic drive type. The main clutch 13 is, for example, a multi-plate clutch.

A sprocket 18, which is a rotating member that rotates together with the input shaft 12a, is provided around the input shaft 12a between the primary gear 17 and the gear trains 12c. The drive motor M includes a motor housing Ma and a motor drive shaft Mb protruding from the motor housing Ma, and a sprocket 19 is provided on the motor drive shaft Mb so as to rotate together with the motor drive shaft Mb. Incidentally, instead of the sprockets 18 and 19, a gear or a pulley may be used as the rotating member. A chain 20, which is a power transmission member, is connected to the sprocket 18 on an input shaft 12a side and the sprocket 19 on a motor drive shaft Mb side. As a result, a driving force of the drive motor M is transmitted to the input shaft 12a via the sprocket 18.

An electronic control unit (hereinafter, referred to as "ECU") 25 controls the engine E. Specifically, a throttle device T, a fuel injection device F, and an ignition device I are controlled. In addition, the ECU 25 controls, based on a signal received from a sensor 40 to be described later, a generator 30 to be described later as a starter motor to start the engine E.

The generator 30 is disposed at a left end portion of the crankshaft Eb of the engine E. The generator 30 includes a rotor 31 and a stator 32. The generator 30 generates electric power by rotation of the rotor 31. According to the present embodiment, the generator 30 is an outer rotor type generator.

The rotor 31 has a substantially bottomed cylindrical shape opening leftward. The rotor 31 includes a bottom wall portion 31a and a peripheral wall portion 31b. The bottom wall portion 31a has a substantially disc shape or a substantially annular shape. The peripheral wall portion 31b has a substantially cylindrical shape connected to an outer peripheral edge portion of the bottom wall portion 31a. The peripheral wall portion 31b protrudes leftward from the bottom wall portion 31a. The crankshaft Eb is fixed to the bottom wall portion 31a of the rotor 31, and the rotor 31 rotates together with the crankshaft Eb. Rotation centers of the rotor 31 and the crankshaft Eb coincide with a central axis of the peripheral wall portion 31b. A magnet is disposed on the peripheral wall portion 31b of the rotor 31. The stator 32 is disposed on an inner side of the peripheral wall portion 31b of the rotor 31 in the radial direction. The stator 32 and the peripheral wall portion 31b of the rotor 31 face each other in the radial direction.

Figure 3:
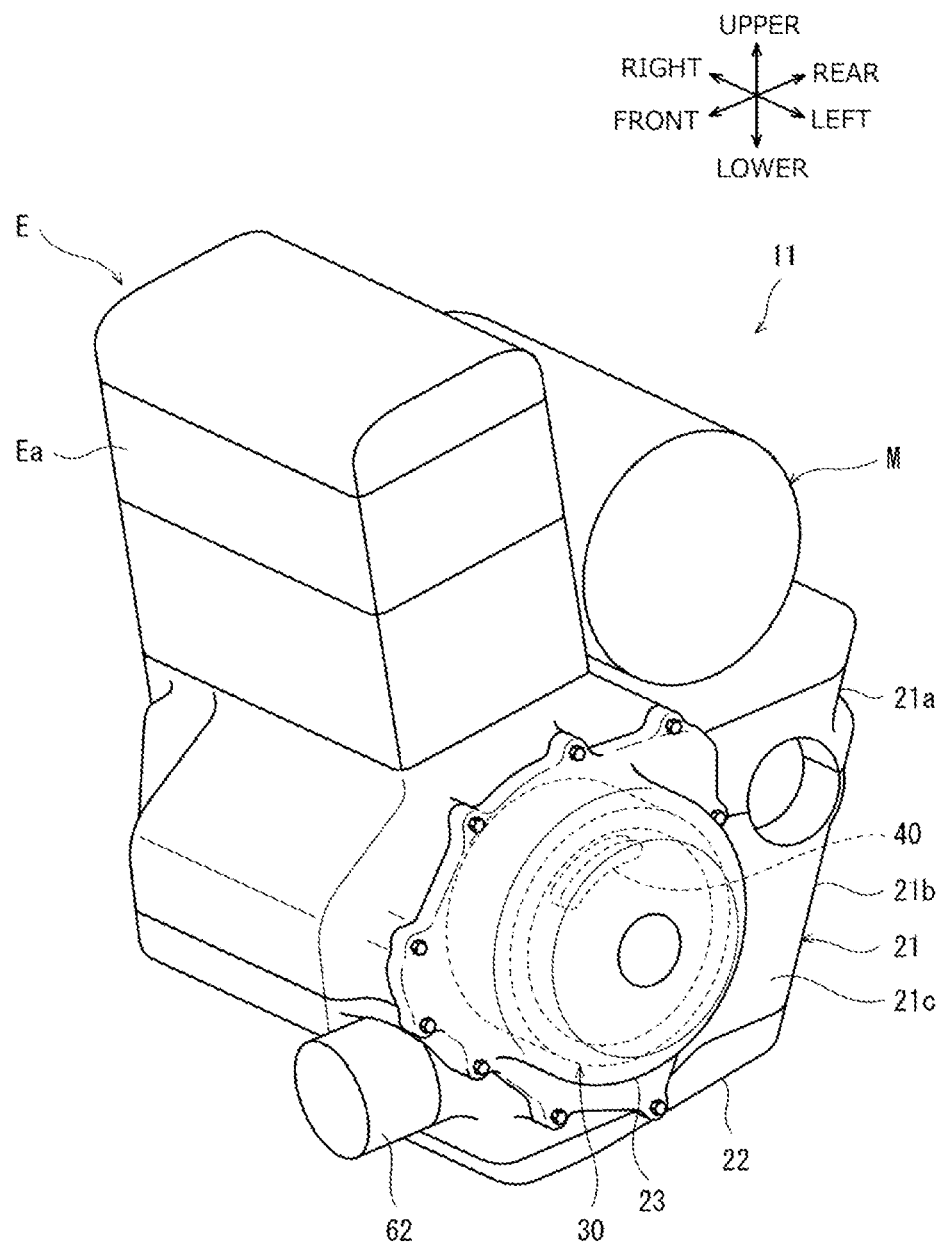
FIG. 3 is a perspective view of the engine unit in FIG. 1 as viewed obliquely from a front left side.

FIG. 3 is a perspective view of the engine unit 11 in FIG. 1 as viewed obliquely from a front left side. The crankcase 21 is of a vertically divided type. The crankcase 21 includes an upper case portion 21a and a lower case portion 21b. The crankshaft Eb and the balancer shaft B are located on the same plane that divides the upper case portion 21a and the lower case portion 21b of the crankcase 21 (see also FIG. 4). The crankcase 21 has a box shape, and the upper case portion 21a is disposed on an upper side of the lower case portion 21b so as to cover the crankshaft Eb and the balancer shaft B set in the lower case portion 21b, and is fixed to the lower case portion 21b.

The generator 30 is disposed outside the crankcase 21. Specifically, the left end portion of the crankshaft Eb protrudes from a left side wall 21c of the crankcase 21 to the outside of the crankcase 21. The rotor 31 is fixed to the left end portion of the crankshaft Eb outside the crankcase 21. A cover 23 is attached to the left side wall 21c of the crankcase 21 so as to cover the generator 30 from the left.

The cover 23 has a concave shape opening rightward. An accommodation space S in which the generator 30 is accommodated is defined by the left side wall 21c of the crankcase 21 and the cover 23. The stator 32 is fixed to the cover 23. More specifically, the stator 32 is fixed to an inner surface of the cover 23, which is a surface facing the accommodation space S. When the cover 23 is attached to the crankcase 21, the stator 32 is disposed so as to face the rotor 31, more specifically, the peripheral wall portion 31b of the rotor 31 in the radial direction.

FIG. 4 is a partially enlarged left side view of the engine unit 11 in FIG. 1 with the cover 23 removed. The left side wall 21c of the crankcase 21 that is in contact with the cover 23 has a contact surface 21d that is in surface contact with a peripheral edge portion of the cover 23. The contact surface 21d has an annular shape when viewed from the left. A surface of the left side wall 21c facing the accommodation space S is formed in a concave shape. In an outer surface of the left side wall 21c, the contact surface 21d is located to the left of other surfaces of the left side wall 21c. That is, according to the present embodiment, the accommodation space S is formed by a concave portion of the left side wall 21c and a concave portion of the cover 23. However, the surface of the left side wall 21c facing the accommodation space S may not be formed in a concave shape.

The generator 30 is a so-called integrated starter generator (ISG) that also functions as a starter motor of the engine E. The sensor 40 for causing the generator 30 to also function as the starter motor is disposed in the vicinity of the generator 30. The sensor 40 detects a rotation position, that is, a rotation angle of the rotor 31. According to the present embodiment, the sensor 40 is a magnetic sensor utilizing a Hall effect, that is, a Hall sensor having a Hall IC. The sensor 40 is connected to the ECU 25 via wiring. However, in the drawings, the wiring to be connected to the sensor 40 is omitted.

According to the present embodiment, the sensor 40 is attached to the stator 32. The sensor 40 is disposed above the rotation center of the crankshaft Eb.

Figure 5A:
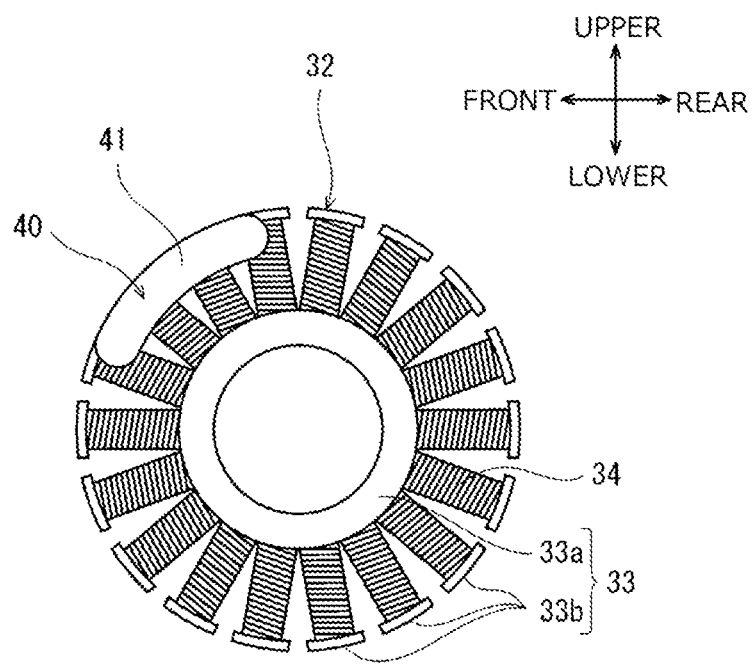
FIG. 5A is a side view of a stator to which a sensor is attached.
Figure 5B:
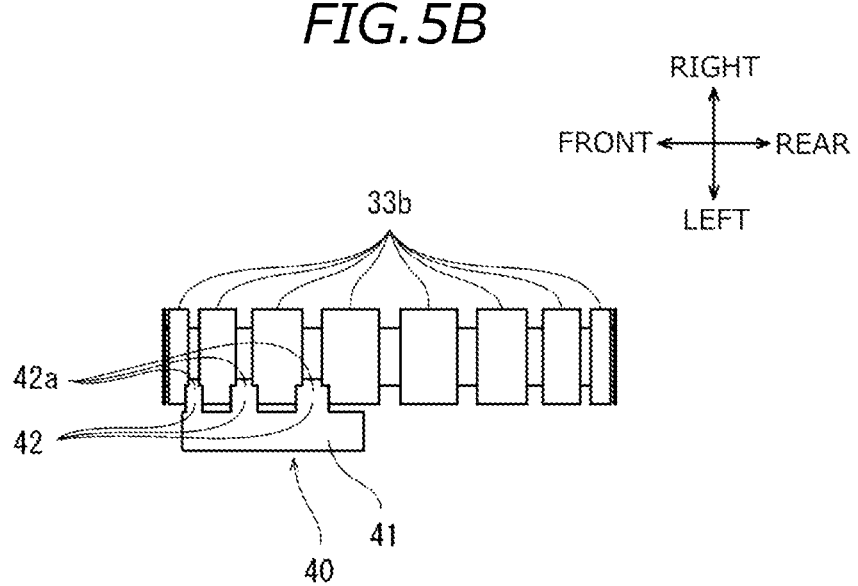
FIG. 5B is a top view of the stator to which the sensor is attached.

FIG. 5A is a side view of the stator 32 to which the sensor 40 is attached. FIG. 5B is a top view of the stator 32 to which the sensor 40 is attached. The stator 32 includes a stator core 33. The stator core 33 includes an annular base portion 33a and a plurality of tooth portions 33b radially protruding from the base portion 33a. The plurality of tooth portions 33b are provided at intervals in a circumferential direction. The stator 32 is formed by winding a coil 34 around each of the tooth portions 33b of the stator core 33.

The sensor 40 is fixed to some of the plurality of tooth portions 33b. Specifically, the sensor 40 includes a main body portion 41 and a plurality of engaging portions 42 that protrude rightward from the main body portion 41 and engage with the stator 32. The main body portion 41 is formed in an arc shape extending in the circumferential direction. More specifically, the main body portion 41 includes an arc-shaped housing extending in the circumferential direction, and electronic components such as a Hall IC are accommodated in the housing. An upper surface of the main body portion 41 and front end portions of the tooth portions 33b are on substantially the same arc-shaped curve in a side view. The wiring extending from the ECU 25 is connected to the main body portion 41.

Each of the engaging portions 42 protrudes rightward from the main body portion 41 so as to be continuous with the upper surface of the main body portion 41, and is fitted between two adjacent tooth portions 33b. A portion of the engaging portion 42 entered between the two tooth portions 33b faces the peripheral wall portion 31b of the rotor 31 in the radial direction together with the stator 32. Hereinafter, the portion of the engaging portion 42 entered between the two tooth portions 33b is referred to as a facing portion 42a.

Returning to FIG. 4, the engine unit 11 includes a coolant passage 50. The coolant passage 50 includes an ejection port 50a, guides the coolant for cooling the sensor 40 to the ejection port 50a, and ejects the coolant from the ejection port 50a toward the sensor 40. The coolant passage 50 includes a cover passage 51 indicated by a broken line in FIG. 4. The cover passage 51 is formed in the cover 23. The ejection port 50a is a downstream end portion of the cover passage 51.

According to the present embodiment, in the coolant passage 50, lubricating oil (hereinafter, also referred to as "oil") to be supplied to the engine E, the transmission 12, and the like in the crankcase 21 is used as the coolant. That is, the coolant passage 50 and a lubricant passage 60 are connected to each other. For example, the lubricant passage 60 is a flow path included in an existing engine unit. The lubricant passage 60 is a flow path through which lubricating oil for lubricating a predetermined member such as a crankshaft accommodated in a crankcase flows. A flow of the oil used as the coolant will be described with reference to FIGS. 6 to 9.

Figure 6:
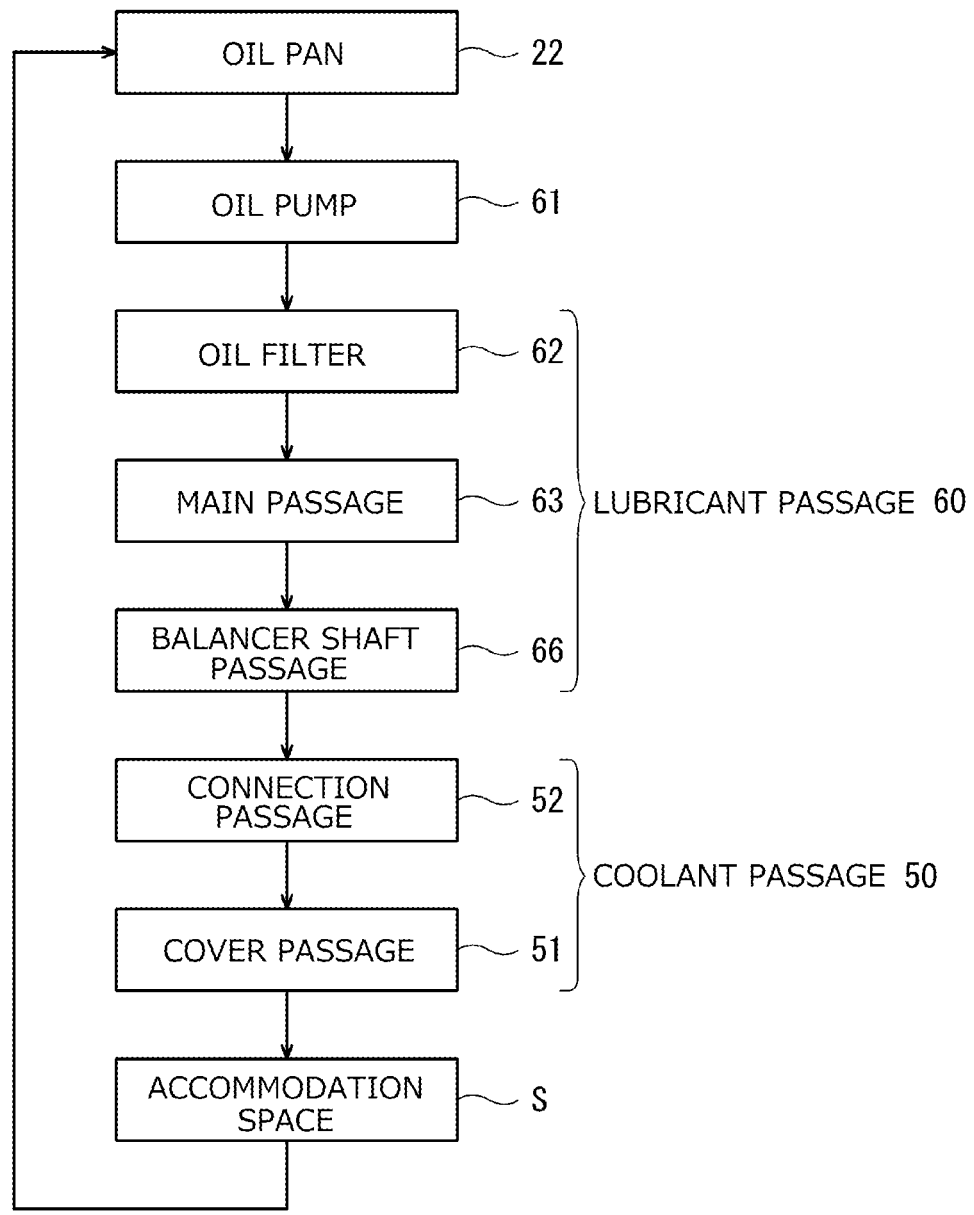
FIG. 6 is a block diagram illustrating an oil path of the engine unit in FIG. 1.

FIG. 6 is a block diagram illustrating an oil path of the engine unit 11 in FIG. 1. The oil stored in the oil pan 22 is sucked up by an oil pump 61 via an oil strainer and sucked into the oil pump 61. The oil pump 61 is accommodated in the crankcase 21. The engine E and the drive motor M are connected to the oil pump 61 in a power transmittable manner. That is, the oil pump 61 is a mechanical pump driven by a driving force of the engine E and the driving force of the drive motor M. However, the oil pump 61 may be an electric pump.

Figure 7:
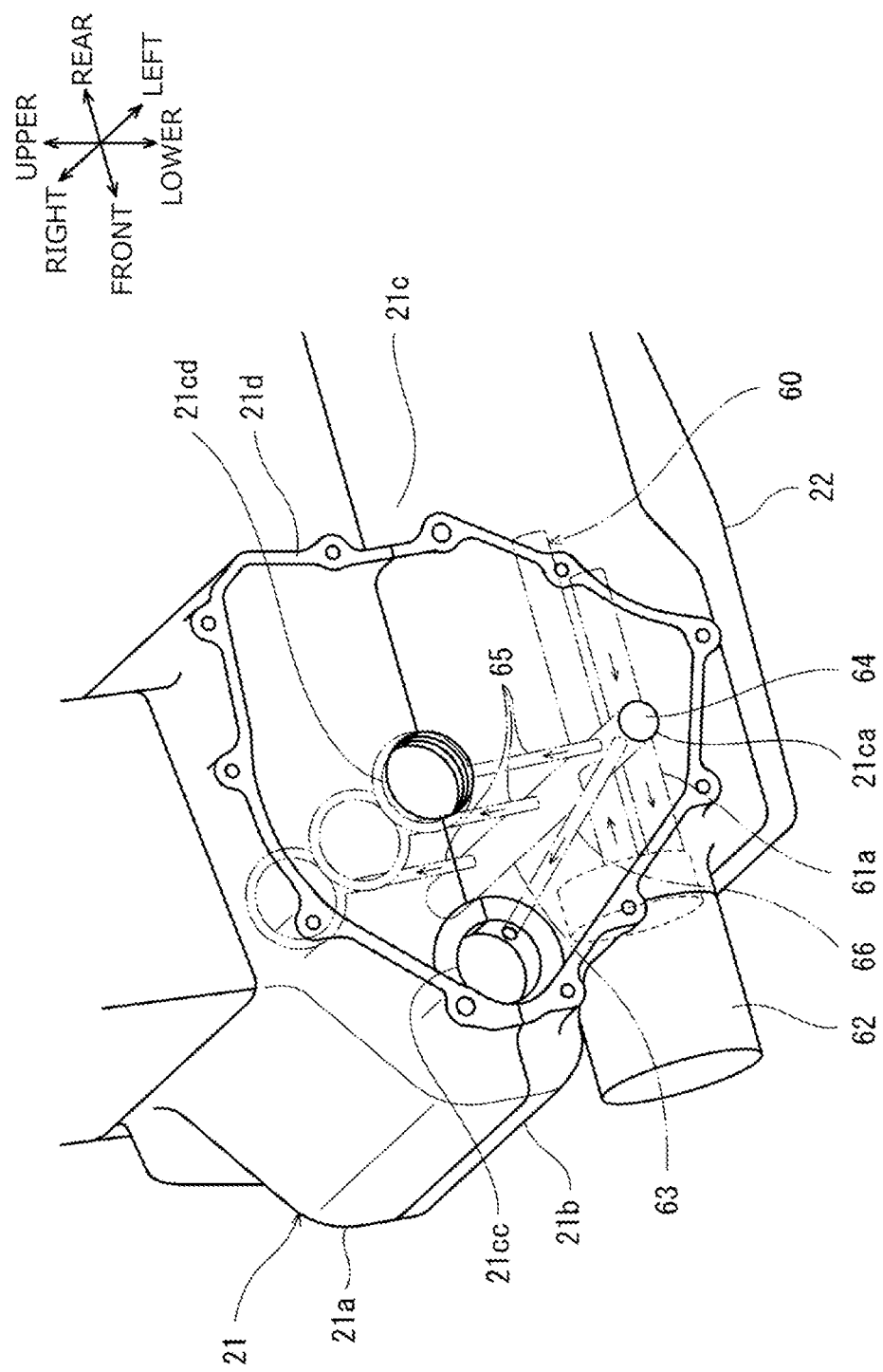
FIG. 7 is a view illustrating a lubricant passage in a crankcase.

FIG. 7 is a perspective view of the engine unit 11. In FIG. 7, the generator 30 and the cover 23 are omitted for easy understanding of the left side wall 21c of the crankcase 21 and the lubricant passage 60 in the crankcase 21. Oil discharged from the oil pump 61 is supplied to an oil filter 62 through a flow path 61a in the crankcase 21. The oil supplied to the oil filter 62 is filtered by the oil filter 62 and supplied to a main passage 63 of the lubricant passage 60 of the engine E.

The main passage 63 extends in the left-right direction inside the crankcase 21. The main passage 63 is integrally formed at the time of manufacturing the engine unit 11, for example, at the time of molding the crankcase 21. More specifically, the main passage 63 is formed so as to penetrate the left side wall 21c of the crankcase 21 by casting during the molding. Therefore, an opening 21ca connected to the main passage 63 is formed in the left side wall 21c of the crankcase 21. The opening 21ca at a left end portion of the main passage 63 is closed by a closing member 64 fixed to the left side wall 21c. The closing member 64 is, for example, a plug or a cap.

In addition to the opening 21ca for forming the main passage 63, an opening 21cb for the crankshaft Eb and an opening 21cc for the balancer shaft B are formed in the left side wall 21c of the crankcase 21. A bearing of the crankshaft Eb is disposed in the opening 21cb. The opening 21cb for the crankshaft allows the crankshaft Eb to pass therethrough. A bearing of the balancer shaft B is disposed in the opening 21cc. A left end portion of the balancer shaft B is disposed in the opening 21cc for the balancer shaft. The openings 21ca, 21cb, and 21cc may be formed by casting or may be formed by another method such as drilling. The openings 21ca, 21cb, and 21cc are all open to the accommodation space S. That is, the openings 21ca, 21cb, and 21cc are disposed on an inner side of the annular contact surface 21d.

A plurality of crankshaft passages 65 for guiding the lubricating oil to the bearing supporting the crankshaft Eb are branched from the main passage 63. In addition, a balancer shaft passage 66 for guiding the lubricating oil to the bearing supporting the balancer shaft B is branched from the main passage 63. The coolant passage 50 guides the lubricating oil that has passed through the balancer shaft passage 66 to the sensor 40.

Figure 8:
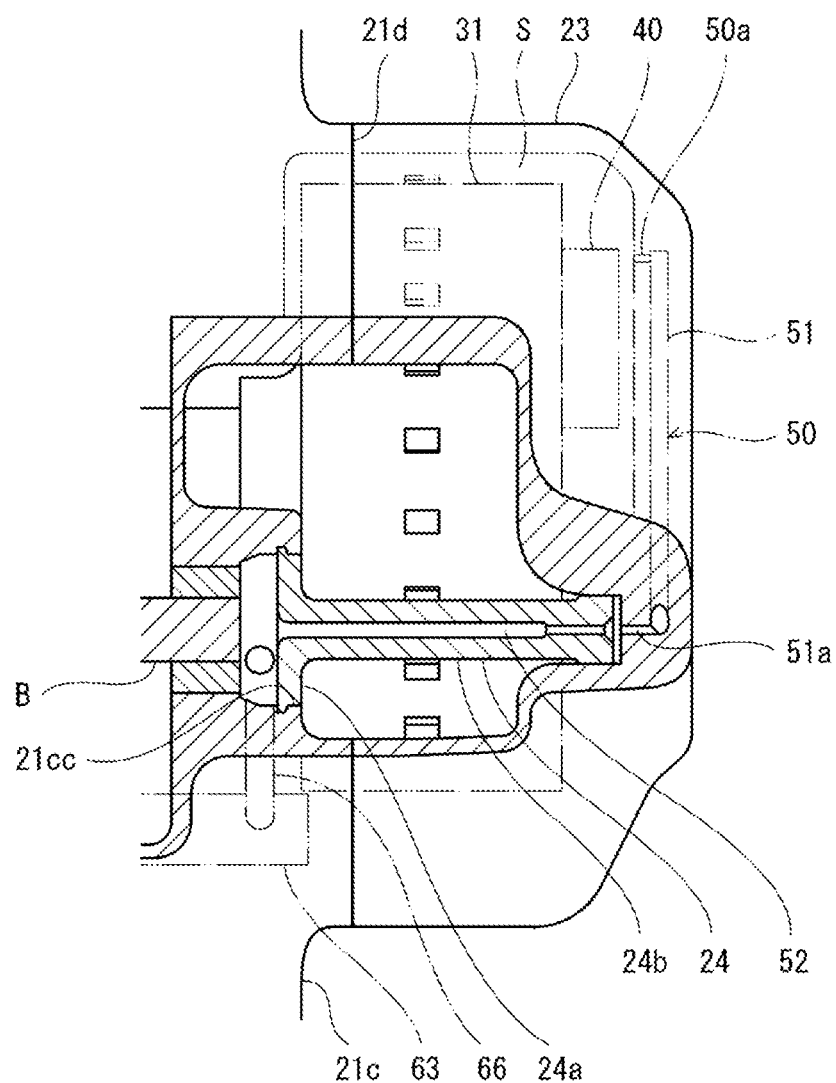
FIG. 8 is a partially enlarged cross-sectional view of the engine unit in FIG. 3 taken along a plane perpendicular to a front-rear direction.
Figure 9:
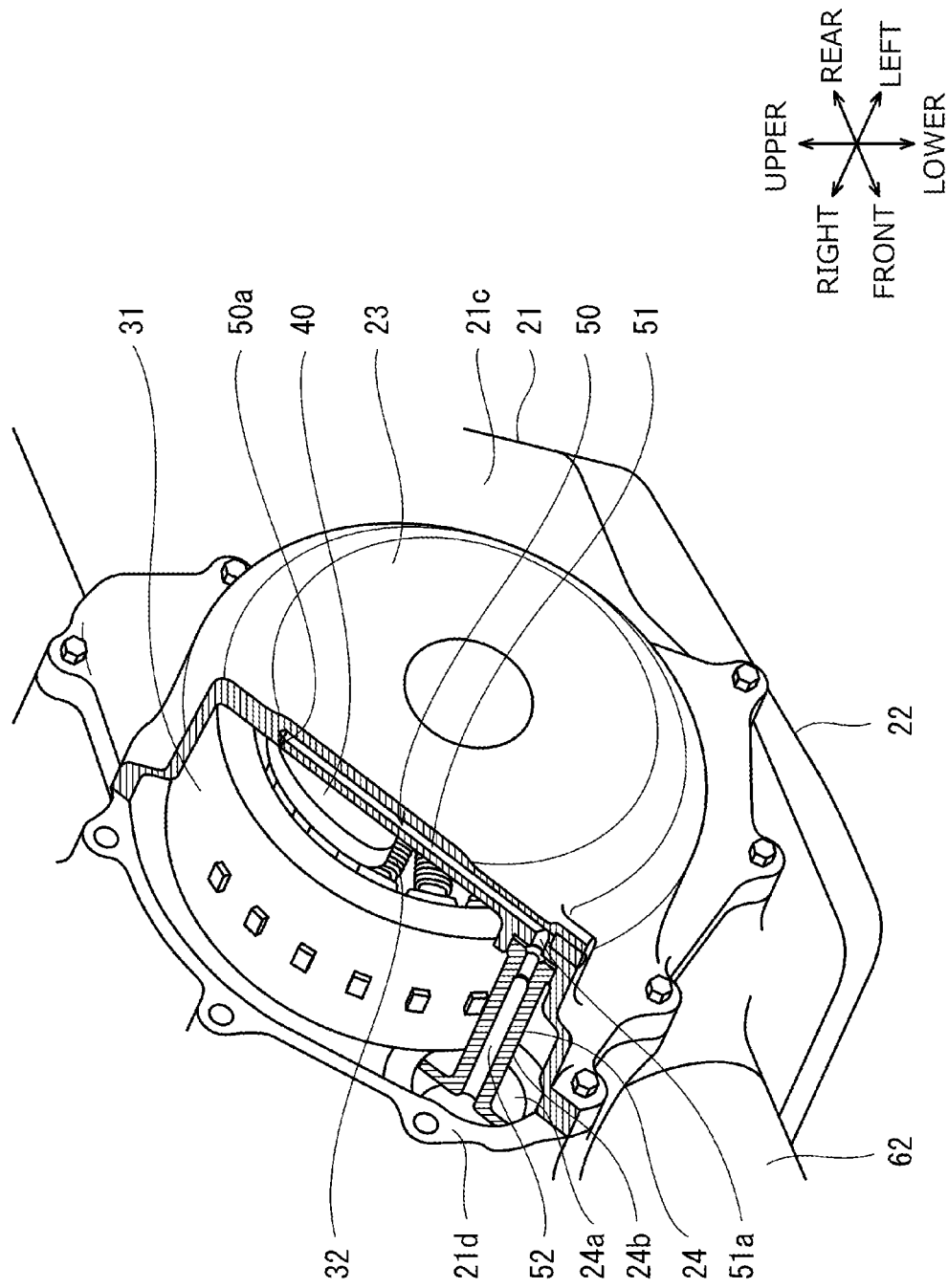
FIG. 9 is a partially enlarged perspective view illustrating the engine unit in FIG. 3 in a partially cutaway state.

FIG. 8 is a partially enlarged cross-sectional view of the engine unit 11 in FIG. 3 taken along a plane perpendicular to the front-rear direction. FIG. 9 is a partially enlarged perspective view illustrating the engine unit 11 in FIG. 3 in a partially cutaway state. A connection member 24 is disposed in the accommodation space S. The connection member 24 extends in the left-right direction. The cross-sectional view in FIG. 8 is a view taken along a plane passing through the connection member 24. The connection member 24 is disposed on a front side of the crankshaft Eb. More specifically, the connection member 24 is located at the same position as the balancer shaft B in the front-rear direction and the upper-lower direction.

The connection member 24 includes a disc portion 24a having substantially the same shape and size as the opening 21cc, and a columnar portion 24b protruding leftward from a central portion of the disc portion 24a to the cover 23. The disc portion 24a is disposed in the opening 21cc so as to close the opening 21cc. A left end portion of the columnar portion 24b is in contact with the inner surface of the cover 23. The connection member 24 is formed with a connection passage 52 penetrating a central portion of each of the disc portion 24a and the columnar portion 24b in the left-right direction. The connection passage 52 extends linearly in the left-right direction. An inflow port 51a of the cover passage 51 is opened in the inner surface of the cover 23, and the connection passage 52 connects the opening 21cc of the crankcase 21 and the inflow port 51a of the cover passage 51 in the accommodation space S.

The lubricating oil flows from the main passage 63 through the balancer shaft passage 66, and then flows into the connection passage 52 at the opening 21cc. The lubricating oil flowing through the connection passage 52 flows into the cover passage 51 from the inflow port 51a and is guided to the ejection port 50a.

The ejection port 50a is disposed above the rotation center of the crankshaft Eb. When viewed in the axial direction of the crankshaft Eb, the ejection port 50a is located at a position overlapping a space between an upper surface of the sensor 40 and an inner peripheral surface of the rotor 31 facing the upper surface. In addition, the ejection port 50a faces the axial direction of the crankshaft Eb. The coolant passage 50 injects the coolant in the axial direction of the crankshaft Eb toward the upper surface of the sensor 40 including the facing portion 42a such that the coolant enters a space between the upper surface of the sensor 40 and the inner peripheral surface of the rotor 31, the upper surface and the inner peripheral surface facing each other in the radial direction.

A flow path cross-sectional area of the ejection port 50a is smaller than a flow path cross-sectional area of the remaining portion of the cover passage 51. Therefore, it is possible to increase a flow velocity of the oil ejected from the ejection port 50a, and it is easy to enhance an effect of cooling the sensor while inhibiting a flow rate of the ejected oil. In addition, since the flow rate of the ejected oil is reduced, it is possible to prevent the oil from being accumulated in a bottom portion of the accommodation space S and the accumulated oil from becoming a resistance to rotation of the rotor 31.

The lubricating oil ejected from the ejection port 50a comes into contact with the sensor 40 to cool the sensor 40. After coming into contact with the sensor 40, the lubricating oil falls below the accommodation space S and accumulates in the bottom portion of the accommodation space S. A discharge port is provided in the bottom portion of the accommodation space S, and oil discharged from the discharge port flows to the oil pan 22.

As described above, the engine unit 11 according to the present embodiment includes the coolant passage 50 that guides the coolant to the ejection port 50a and ejects the coolant from the ejection port 50a toward the sensor 40. Since the coolant is ejected from the ejection port 50a toward the sensor 40 to liquid-cool the sensor 40, heat of the sensor 40 can be easily taken away and the sensor 40 can be effectively cooled.

According to the present embodiment, since the coolant passage 50 ejects the coolant toward the facing portion 42a of the sensor 40 that faces the rotor 31 in the radial direction, the coolant can be ejected to a portion where a temperature is likely to rise due to heat from the rotor 31.

According to the present embodiment, since the sensor 40 and the ejection port 50a are disposed above the rotation center of the crankshaft Eb, the sensor 40 is less likely to be immersed in the coolant accumulated in the lower portion of the accommodation space S. As a result, it is possible to prevent an abnormality from occurring in the sensor 40 due to water immersion. In addition, since the sensor 40 is disposed above the rotation center of the crankshaft Eb, when the ECU 25 is located above the rotation center of the crankshaft Eb, the wiring from the sensor 40 to the ECU 25 can be shortened.

According to the present embodiment, the coolant passage 50 injects the coolant toward the upper surface of the sensor 40. The coolant injected toward the upper surface of the sensor 40 flows downward along a side surface of the sensor 40 after flowing along the upper surface of the sensor 40. As a result, a surface area of the sensor 40 in contact with the coolant can be increased to enhance cooling efficiency.

According to the present embodiment, an upper surface of the facing portion 42a of the sensor 40 faces the inner peripheral surface of the rotor 31 in the radial direction, and the coolant passage 50 injects the coolant toward the upper surface of the sensor 40 in the axial direction of the crankshaft Eb such that the coolant enters the space between the upper surface of the sensor 40 and the inner peripheral surface of the rotor 31, the upper surface and the inner peripheral surface facing each other in the radial direction. As a result, the coolant moves in the axial direction along the upper surface of the sensor 40, and therefore, it is possible to increase the surface area of the sensor 40 in contact with the coolant.

According to the present embodiment, the cover 23 includes the cover passage 51 which is a part of the coolant passage 50. Since heat of the oil passing through the cover passage 51 is taken away by the cover 23, the coolant is easily cooled.

According to the present embodiment, the lubricant passage 60 included in the crankcase and the coolant passage 50 are connected to each other, and the coolant passage 50 ejects the lubricating oil toward the sensor 40 as the coolant. Therefore, it is not necessary to separately provide a tank for accumulating the coolant and a pump for supplying the coolant in the engine unit.

According to the present embodiment, the connection member 24 is disposed inside the accommodation space S. Therefore, even if the lubricating oil leaks from an end portion of the connection member 24, the leaked lubricating oil is accumulated in the accommodation space S, and it is possible to prevent the lubricating oil from leaking to the outside of the accommodation space S.

Incidentally, through holes or the like for disposing a balancer shaft are formed in a side wall of a crankcase of an engine unit in the related art at the time of manufacturing the crankcase. These through holes are closed by a closing member such as a plug or a cap in order to prevent the lubricating oil from being discharged from the through holes to the outside of the crankcase. According to the present embodiment, the opening 21cc formed at the time of manufacturing the crankcase 21 is used as a hole for guiding the oil from the lubricant passage 60 to the coolant passage 50. Therefore, the oil can flow into the coolant passage 50 without remodeling the crankcase of the existing design.

Other Embodiments

The present disclosure is not limited to the embodiments described above, and configurations thereof can be changed, added, or deleted.

For example, in the above-mentioned embodiment, the lubricating oil is supplied to the coolant passage 50 through the opening 21cc for the balancer shaft, but the lubricating oil may be supplied to the coolant passage 50 through the opening 21ca connected to the main passage 63. In this case, for example, instead of the closing member 64, an end portion of a connection member in which a connection passage is formed may be disposed in the opening 21ca illustrated in FIG. 7, and the closing member may be disposed in the opening 21cc. A shape of the connection member, a shape of the cover passage, and an arrangement of the inflow port of the cover passage can be appropriately designed.

The coolant passage may not include the connection passage that connects the opening on the side wall of the crankcase and the cover passage. That is, the lubricant passage and the cover passage as the coolant passage may be connected to each other at a surface where the crankcase and the cover are in contact with each other.

Figure 10:
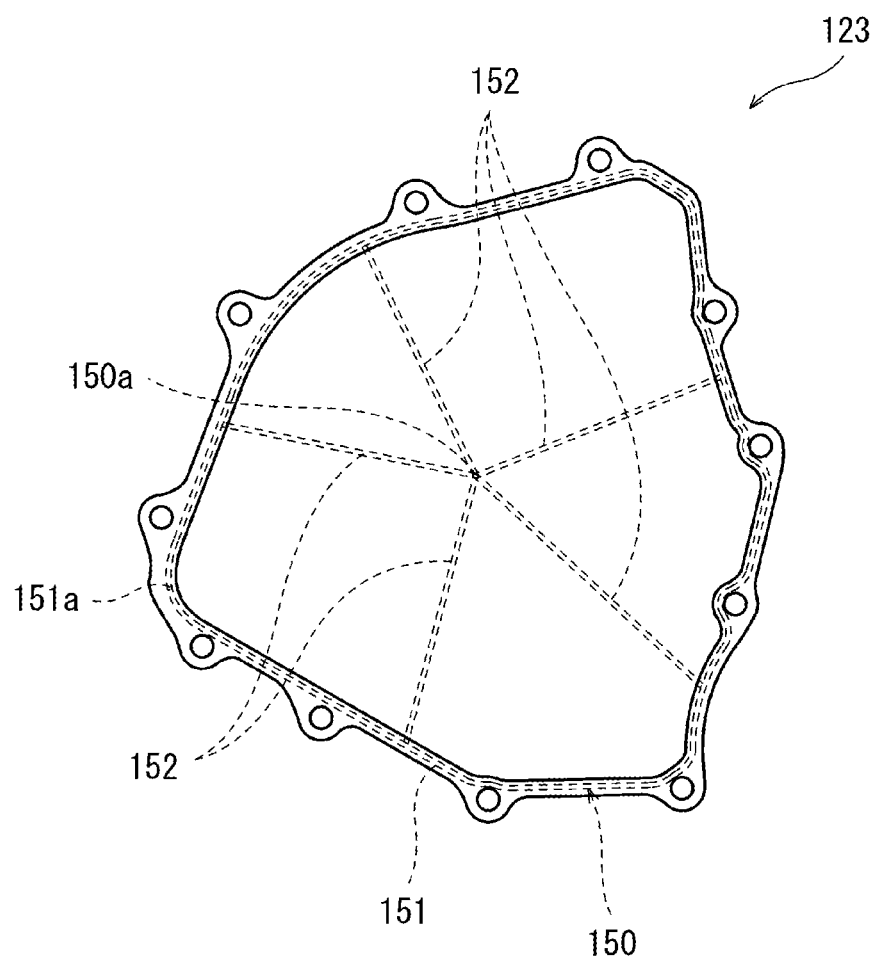
FIG. 10 is a view illustrating a cover of an engine unit according to a modification.

For example, FIG. 10 illustrates a cover 123 of an engine unit according to a modification. The cover 123 includes a cover passage 150. The cover passage 150 includes a plurality of branch paths between an inflow port 151a and an ejection port 150a. Specifically, the cover passage 150 includes an annular first passage 151 along an annular contact surface of the cover 123 with respect to a crankcase, and a plurality of second passages 152 extending from a plurality of locations in the first passage 151 to the ejection port 150a, respectively. The crankcase is formed with a flow path that is connected to the inflow port 151a of the cover passage 150 and supplies oil to the inflow port 151a. In this way, a path of the oil from the inflow port 151a to the ejection port 150a branches into a plurality of paths. Since the cover passage 150 includes the plurality of branch paths, a surface area of the coolant can be increased, and an effect of cooling the coolant by an outside air coming into contact with the cover 123 is enhanced.

In the above-mentioned embodiment, the generator 30 is disposed at the left end portion of the crankshaft Eb of the engine E, but the generator may be disposed at a right end portion of the crankshaft of the engine.

An injection position at which the coolant is injected may be a position on an upstream side of the sensor in a rotation direction of the rotor. In this case, the coolant flows to a downstream side in the rotation direction on a peripheral surface of the sensor with rotation of the rotor, and the coolant can be guided over a wide range with a low flow rate.

The sensor may not include a facing portion facing the rotor in the radial direction. For example, in the above-mentioned embodiment, the sensor is fixed to the stator, but the sensor may not be fixed to the stator. The sensor may be fixed to the inner surface of the cover.

In the above-mentioned embodiment, the sensor and the ejection port are disposed above the rotation center of the crankshaft, but the sensor and the ejection port may be disposed at the same height as the rotation center of the crankshaft, or may be disposed below the rotation center of the crankshaft.

In the above-mentioned embodiment, the generator is of an outer rotor type, but the generator may be of an inner rotor type.

The coolant passage may not inject the coolant in the axial direction of the crankshaft, and may inject the coolant in a direction intersecting the axial direction of the crankshaft.

The cover includes the cover passage which is a part of the coolant passage, but the cover may not include the part of the coolant passage. For example, a flow path forming member that is a member different from the cover and the crankcase may be disposed in the accommodation space S, and the coolant passage may be formed by the flow path forming member.

The coolant passage and the lubricant passage may not be connected to each other, and the coolant may not use the lubricating oil. The tank for accumulating the coolant or the pump for supplying the coolant may be separately provided in the engine unit.

In the above-mentioned embodiment, the Hall sensor having the Hall IC is exemplified as the sensor for detecting the rotation angle of the rotor, but the sensor for detecting the rotation angle of the rotor, that is, the sensor for cooling the coolant passage may be another type of sensor such as a magnetic sensor or a resolver sensor of another type.

In the above-mentioned embodiment, the motorcycle is a hybrid vehicle, but the motorcycle may be an engine vehicle using only the engine as a traveling drive source. That is, the engine unit may not include the drive motor M. In addition, the saddle riding vehicle including the engine unit is not limited to the motorcycle, and may be a three-wheeled motorcycle or the like.

An engine unit according to an aspect of the present disclosure includes: a cylinder; a crankshaft connected to a piston in the cylinder; a crankcase that accommodates the crankshaft; a generator that includes a rotor that rotates together with the crankshaft and a stator facing the rotor, and generates electric power by rotation of the rotor; a sensor configured to detect a rotation position of the rotor; and a coolant passage that includes an ejection port, guides a coolant to the ejection port, and ejects the coolant from the ejection port toward the sensor.

According to the above-mentioned configuration, since the coolant is ejected from the ejection port toward the sensor to liquid-cool the sensor, heat of the sensor can be easily taken away and the sensor can be effectively cooled.

In the above-mentioned engine unit, the sensor may include a facing portion facing the rotor in a radial direction, and the coolant passage may eject the coolant from the ejection port toward the facing portion of the sensor. According to this configuration, since the coolant passage ejects the coolant toward the facing portion of the sensor that faces the rotor in the radial direction, the coolant can be ejected to a portion where a temperature is likely to rise due to heat from the rotor.

The above-mentioned engine unit may further include a cover that covers the rotor and defines an accommodation space in which the rotor and the sensor are accommodated, and the sensor and the ejection port may be disposed above the crankshaft. According to this configuration, the sensor is less likely to be immersed in the coolant accumulated in the lower portion of the accommodation space. As a result, it is possible to prevent a sensor abnormality due to water immersion.

In the above-mentioned engine unit, the coolant passage may inject the coolant toward an upper surface of the sensor. According to this configuration, the coolant injected toward the upper surface of the sensor flows downward along a side surface of the sensor after flowing along the upper surface of the sensor. As a result, a surface area of the sensor in contact with the coolant can be increased to enhance cooling efficiency.

In the above-mentioned engine unit, the rotor may have a cylindrical shape, the crankshaft may have an annular shape, at least a part of the upper surface of the sensor may face an inner peripheral surface of the rotor in a radial direction above the crankshaft, and the coolant passage may inject the coolant toward the upper surface of the sensor in an axial direction of the crankshaft such that the coolant enters a space between the upper surface of the sensor and the inner peripheral surface of the rotor, the upper surface and the inner peripheral surface facing each other in the radial direction. According to this configuration, the coolant moves in the axial direction along the upper surface of the sensor, and therefore, it is possible to increase the surface area of the sensor in contact with the coolant.

The above-mentioned engine unit may further include the cover that covers the rotor and defines an accommodation space in which the rotor and the sensor are accommodated, and the cover may include at least a part of the coolant passage. According to this configuration, since the heat is taken away by the cover, the coolant is easily cooled.

In the above-mentioned engine unit, the crankcase may include a lubricant passage through which lubricating oil for lubricating a predetermined member accommodated in the crankcase flows, the coolant passage and the lubricant passage may be connected to each other, and the coolant passage may eject the lubricating oil toward the sensor as a coolant.

In the above-mentioned engine unit, an end portion of the crankshaft may protrude from a side wall of the crankcase to the outside of the crankcase, the rotor may be fixed to the end portion of the crankshaft outside the crankcase, the engine unit may further include a cover attached to the crankcase so as to cover the rotor, the cover may include the coolant passage, and the coolant passage and the lubricant passage may be connected to each other on a surface where the crankcase and the cover are in contact with each other. According to this configuration, since the lubricating oil flows directly into the coolant passage in the cover from the lubricant passage, a member that guides the lubricating oil from the lubricant passage to the coolant passage in the cover is not necessary, and the number of components can be reduced.

What is claimed is:

1. An engine unit comprising: a cylinder; a crankshaft connected to a piston in the cylinder; a crankcase that accommodates the crankshaft; a generator that includes a rotor that rotates together with the crankshaft and a stator facing the rotor, and generates electric power by rotation of the rotor; a sensor configured to detect a rotation position of the rotor; a coolant passage that includes an ejection port, guides a coolant to the ejection port, and ejects the coolant from the ejection port toward the sensor, wherein the coolant passage is configured to eject the coolant from the ejection port toward a portion of the sensor, the portion facing the rotor in a radial direction of the rotor and being positioned above a central axis of the crankshaft; a cover that covers the rotor and defines an accommodation space in which the rotor and the sensor are accommodated, wherein the cover includes at least a part of the coolant passage, wherein the sensor includes an upper surface facing the rotor in the radial direction, and a side surface facing the rotor in an axial direction of the crankshaft, and wherein the coolant passage is configured to eject the coolant from the ejection port toward the upper surface of the portion of the sensor.

2. The engine unit according to claim 1, further comprising:
a cover that covers the rotor and defines an accommodation space in which the rotor and the sensor are accommodated,
wherein the sensor and the ejection port are disposed above a rotation center of the crankshaft.

3. The engine unit according to claim 1, wherein the coolant passage injects the coolant toward an upper surface of the sensor.

4. The engine unit according to claim 1, wherein the crankcase includes a lubricant passage through which lubricating oil for lubricating a member in the crankcase flows,
wherein the coolant passage and the lubricant passage are connected to each other, and
wherein the coolant passage ejects the lubricating oil toward the sensor as the coolant.

5. The engine unit according to claim 4, wherein an end portion of the crankshaft protrudes from a side wall of the crankcase to an outside of the crankcase,
wherein the rotor is fixed to the end portion of the crankshaft outside the crankcase,
wherein the engine unit further comprises a cover attached to the crankcase so as to cover the rotor,
wherein the cover includes the coolant passage, and
wherein the coolant passage and the lubricant passage are connected to each other on a surface where the crankcase and the cover are in contact with each other.

6. The engine unit according to claim 1, wherein the cover includes a cover passage within an inner surface of the cover, and wherein a flow path cross-sectional area of the ejection port is smaller than a flow path cross-sectional area of the cover passage.

7. The engine unit according to claim 1, wherein the sensor is a magnetic sensor utilizing a Hall effect.

8. The engine unit according to claim 1, wherein the sensor is attached to the stator that faces a peripheral wall portion of the rotor in the radial direction.

9. The engine unit according to claim 1, wherein the cover includes a connection passage within an inner surface of the cover, and wherein the connection passage connects an opening of the crankcase and an inflow port of the cover passage.

10. An engine unit comprising: a cylinder; a crankshaft connected to a piston in the cylinder; a crankcase that accommodates the crankshaft; a generator that includes a rotor that rotates together with the crankshaft and a stator facing the rotor, and generates electric power by rotation of the rotor; a sensor configured to detect a rotation position of the rotor; a coolant passage that includes an ejection port, guides a coolant to the ejection port, and ejects the coolant from the ejection port, in an axial direction of the crankshaft, toward the sensor; a cover that covers the rotor and defines an accommodation space in which the rotor and the sensor are accommodated, wherein the cover includes at least a part of the coolant passage, wherein the sensor includes an upper surface facing the rotor in the radial direction, and a side surface facing the rotor in an axial direction of the crankshaft, and wherein the coolant passage is configured to eject the coolant from the ejection port toward the upper surface of the portion of the sensor.

11. An engine unit comprising:
a cylinder;
a crankshaft connected to a piston in the cylinder;
a crankcase that accommodates the crankshaft;
a generator that includes a rotor that rotates together with the crankshaft and a stator facing the rotor, and generates electric power by rotation of the rotor;
a sensor configured to detect a rotation position of the rotor; and
a coolant passage that includes an ejection port, guides a coolant to the ejection port, and ejects the coolant from the ejection port toward the sensor,
wherein the rotor has a cylindrical shape,
wherein at least a portion of an upper surface of the sensor faces an inner peripheral surface of the rotor in a radial direction above a rotation center of the crankshaft, and
wherein the coolant passage is configured to inject the coolant toward the upper surface of the sensor in an axial direction of the crankshaft such that the coolant enters a space between the upper surface of the sensor and the inner peripheral surface of the rotor where the upper surface of the sensor and the inner peripheral surface of the rotor face each other in the radial direction.

* * * * *